United States Patent
Baumann

(10) Patent No.: US 7,380,768 B2
(45) Date of Patent: Jun. 3, 2008

(54) BALANCED-PLUG CAGE STYLE CONTROL VALVE AND BONNET SEAL ASSEMBLY

(75) Inventor: Hans D. Baumann, Rye, NH (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

(21) Appl. No.: 11/361,216

(22) Filed: Feb. 24, 2006

(65) Prior Publication Data

US 2006/0138375 A1  Jun. 29, 2006

Related U.S. Application Data

(62) Division of application No. 11/209,149, filed on Aug. 22, 2005, now Pat. No. 7,083,160, which is a division of application No. 10/447,074, filed on May 28, 2003, now Pat. No. 6,932,321.

(51) Int. Cl.
*F16K 31/44* (2006.01)
(52) U.S. Cl. .................. 251/214; 251/281; 277/530
(58) Field of Classification Search .......... 251/214, 251/281, 282, 324; 277/438, 530, 567
See application file for complete search history.

(56) References Cited

U.S. PATENT DOCUMENTS

| | | | |
|---|---|---|---|
| 2,634,943 A | 4/1953 | Gulick | |
| 2,898,000 A | 8/1959 | Hanny | |
| 3,690,682 A | 9/1972 | Ferrill | |
| 3,834,666 A | 9/1974 | Keith | |
| 3,892,384 A | 7/1975 | Myers | |
| 4,202,556 A | 5/1980 | Makishima et al. | |
| 4,249,574 A | 2/1981 | Schnall et al. | |
| 4,469,123 A | 9/1984 | Merrill | |

OTHER PUBLICATIONS

International Search Report issued in PCT/US2004/014864 mailed on Oct. 6, 2004.
Written Opinion issued in PCT/US2004/014864 application mailed Oct. 6, 2004.

*Primary Examiner*—John K. Fristoe, Jr.
(74) *Attorney, Agent, or Firm*—Marshall, Gerstein & Borun LLP

(57) ABSTRACT

A balance-plug cage style control valve has substantially reduced body-bonnet bolt loading with an elastic seal. The elastic seal assembly includes an annular seal having an elastic region, a compression surface, and at least one sealing surface positioned in a channel within a valve cage mounted inside the valve body. At least one shoulder on the valve bonnet engages the elastic seal to deform the elastic region to place the sealing surface of the seal in contact with at least one of the valve bonnet or the valve cage to form a fluid seal.

7 Claims, 4 Drawing Sheets

PRESSURE

BALANCED-PLUG CAGE STYLE CONTROL VALVE AND BONNET SEAL ASSEMBLY

RELATED APPLICATIONS

This application is a divisional application of and claims priority under 35 U.S.C. §120 to U.S. patent application Ser. No. 11/209,149, entitled "Balanced-Plug Cage Style Control Valve and Bonnet Seal Assembly," filed on Aug. 22, 2005 now U.S. Pat. No. 7,083,160 the entire disclosure of which is hereby expressly incorporated by reference herein, which is a divisional application of and claims priority under 35 U.S.C. §120 to U.S. patent application Ser. No. 10/447,074, entitled "Balanced-Plug Cage Style Control Valve and Bonnet Seal Assembly," filed on May 28, 2003 and which issued as U.S. Pat. No. 6,932,321 on Aug. 23, 2005.

TECHNICAL FIELD

The control valve and bonnet seal assembly described herein makes known an apparatus for reducing excessive bonnet bolt stress and for alleviating the harmful effects of thermal expansion in large globe-style control valves. More specifically, a re-useable elastic seal is disclosed having an arrangement that significantly reduces fluid leaks between a globe valve body and a valve bonnet by absorbing thermal expansion and accommodating assembly tolerance stack-up.

BACKGROUND

Control valves are commonly used to control the fluid flow through a pipe. As known to those skilled in the art, a control valve regulates the rate of fluid flow as the position of the valve plug within the control valve is changed by an actuator. Two important features of a control valve, such as a globe valve, are that it must contain the fluid without external leakage and it must be capable of withstanding the temperature influences of the process. Typical globe valves are used in numerous applications ranging from simple level control to boiler feedwater systems and superheated bypass applications. Globe valves characteristically have a linear moving valve plug contained within a globular-shaped cavity to control flow. Due to the broad application of globe valves, there are a large variety of styles and sizes. Generally, large globe valves are defined as having a flow control orifice or port greater than 6-inches in diameter and are known to suffer from seal failures.

For example, large port globe valves are frequently used in process applications encountering temperatures in excess 300 degrees Fahrenheit and pressure drops exceeding 150 psi. These extreme operating conditions create valve assembly leakage problems due to differences in the thermal expansion of materials of construction and subsequent relaxation of typical gaskets and seals. Leaks are addressed in conventional globe valve assemblies by applying excessive stress or loading in the bonnet bolting. As known to those skilled in the art, excessive bonnet bolting stress increases cost by requiring special materials of construction and increases the probability of failure of the valve in extreme operating conditions by increasing physical stress across the valve bonnet assembly.

SUMMARY

Accordingly, it is the object of the present seal assembly to substantially reduce excessive bonnet bolt loading and to substantially eliminate external leakage between a valve body and a valve bonnet. More specifically, the present seal assembly places an elastic annular seal in a channel adjacent to the valve bonnet to substantially eliminate fluid leakage that would otherwise occur.

In accordance with one aspect of the present seal assembly, a deformable, elastic seal is located in an annular channel within the valve cage. The valve bonnet deforms the elastic seal with an internal flange or shoulder that subsequently retains the valve cage within the valve body.

In accordance with another aspect of the present seal assembly, a hyperbolic elastic seal is located in an annular channel within the valve cage. The hyperbolic elastic seal has an internal cavity that is expanded into the valve body or the valve cage by fluid pressure within the valve to create a pressure-assisted seal.

In accordance with yet another aspect of the present seal assembly, a control valve with an elastically deformable seal substantially reduces the bonnet loading stresses within the control valve assembly.

BRIEF DESCRIPTION OF THE DRAWINGS

The features of this elastic seal assembly are believed to be novel and are set forth with particularity in the appended claims. The present elastic seal assembly may be best understood by reference to the following description taken in conjunction with the accompanying drawings in which like reference numerals identify like elements in the several figures and in which:

DETAILED DESCRIPTION

To fully appreciate the advantages of the present elastic seal assembly, it is necessary to have a basic understanding of the operating principles of a conventional single-port, balanced-cage style globe valve.

Figure 1:
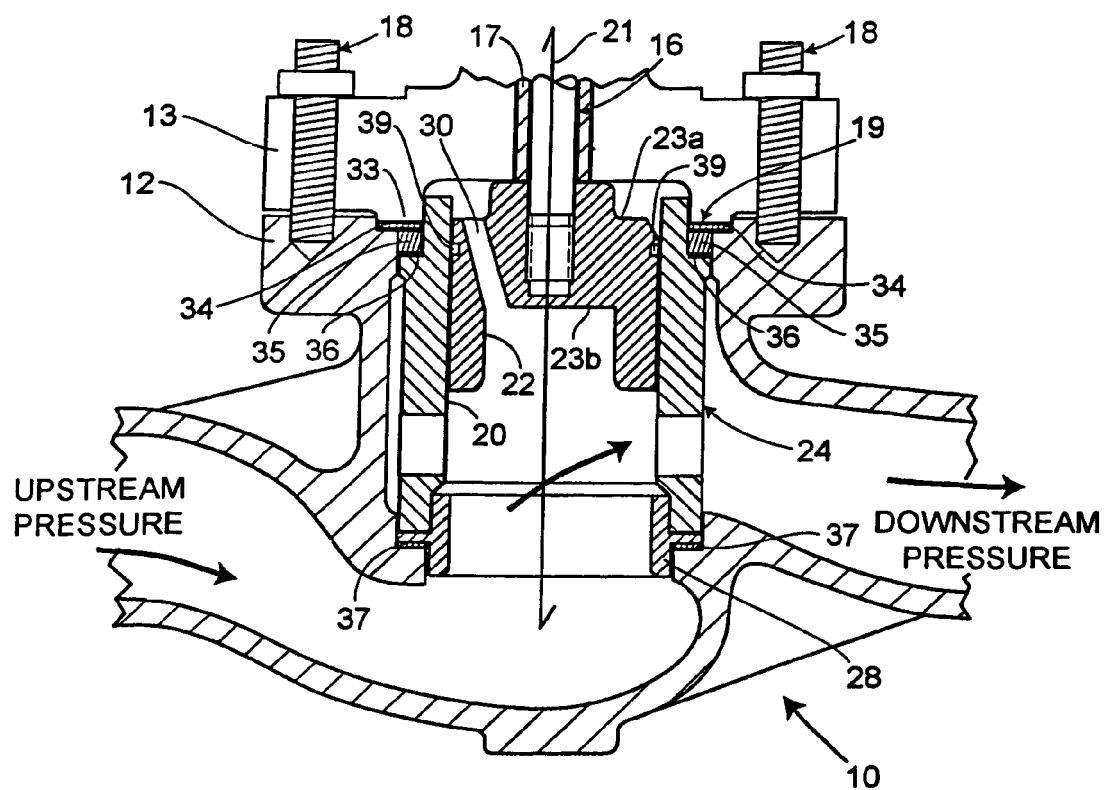
FIG. 1 is a cross-sectioned side view of a prior art balanced-plug cage-style with a conventional bonnet seal.

Referring now to FIG. 1, a typical balanced-plug, cage style globe valve 10 is illustrated. The globe valve 10 is generally comprised of a valve body 12, a valve bonnet 13, and valve trim 24. The valve trim 24 contains the internal components of the globe valve 10 that modulate or control fluid flow through the globe valve and includes a valve plug 22, a valve cage 20, and a valve seat 28. Fluid flow through the globe valve 10 is controlled by linear motion of the valve plug 22 along a central longitudinal axis 21 with respect to the valve seat 28 and a valve stem 16. The valve seat 28 provides an area of contact for the valve plug 22 to create valve shut-off in order to inhibit fluid flow through globe valve 10. The globe valve 10 illustrated in FIG. 1 is shown in a flow-up configuration. The fluid stream flows up through the valve trim 24 as indicated by the flow arrows.

These types of valves have only one seat ring to modulate flow. The force required to move the valve plug 22 is supplied by an actuator assembly (not shown) that is directly coupled to the valve body 12 through the valve bonnet 13. The actuation force from the actuator is transferred to the valve plug 22 through the valve stem 16 that is rigidly attached to the actuator assembly and the valve plug 22. The valve cage 20, which provides valve plug 22 guiding and seat ring 28 retention, is retained within the valve body 12 by a compressive force exerted by the attached valve bonnet 13.

On globe valves, the valve bonnet 13 is a pressure-retaining component within the valve body 12. The valve bonnet 13 not only provides a means of mounting the actuator (not shown) to the valve body 12, but also houses the valve packing 17 to create a fluid seal around the valve stem 16. The most common type of valve bonnet is the bolted-flange type depicted in FIG. 1 showing a valve bonnet 13 with a single integral flange or shoulder 33. On globe valve bodies with bonnet-retained style trim, the valve bonnet 13 furnishes a loading force to prevent leakage between the valve bonnet 13 and the valve body 12 and also between the seat ring 28 and the valve body 12.

In tightening the body-bonnet bolting 18, the valve bonnet 13 compresses a composite seal 19 comprised of a flat sheet gasket 34, a spiral-wound metal gasket 35, and a second flat sheet gasket 36 on top of the valve cage 20 to complete a body-bonnet seal. The compressive load subsequently creates the seat ring-body seal with a flat sheet gasket 37 below the seat ring 28. In addition, a sliding piston ring-type seal 39 located between the upper portion of the valve plug 22 and the valve cage 20 virtually eliminates leakage of the high pressure upstream fluid into the lower pressure downstream system.

As known to those skilled in the art, large single-port globe valves generally have a limited port size and pressure range due to a static force unbalance. The static force unbalance results from high upstream pressure operating on only one side of the valve plug, subsequently producing a significant directional force on the valve plug. To overcome the "pressure-assisted" operation, a large, high thrust actuator must be used. Generally, high thrust actuators required to operate unbalanced globe valves with large port sizes are prohibitively large and expensive. In the alternative, the balanced-plug design shown in FIG. 1 allows upstream fluid, and therefore upstream fluid pressure, to pass through a passageway 30 in the valve plug 22 to operate on both the top 23a and bottom 23b sides of the valve plug 22, thus balancing the plug pressure. This pressure balance nullifies most of the static unbalance force on the valve plug 22. The reduced unbalance force permits operation of the globe valve 10 with smaller actuators than those necessary for conventional unbalanced, single-ported valve bodies. Balanced-plug designs can extend the operating range of a single-port globe valve up to 2500 psi. Consequently, large port, high-pressure globe valves must provide additional sealing capability to prevent high-pressure leaks.

Conventional large port, high-pressure globe valves attempt to prevent leaks between the body-bonnet joint and the seat ring-body seal by using excessive torque on the body-bonnet bolting 18 in conjunction with a composite seal created from a spiral-wound metal gasket 36 sandwiched between two flat sheet gaskets 34 and 35. In bonnet-retained style trim, as shown in crosssection in FIG. 1, spiral-wound metal gaskets 36 are intended to be crushed during assembly to provide a body-bonnet seal that simultaneously accommodates machine tolerance stack-up of the valve trim 24 while maintaining the sufficient down force to retain the valve cage 20 and valve seat 28 during operation. As known to those skilled in the art, spiral-wound metal gaskets are dimensionally restricted. Based upon the diameter of the gasket, a maximum cross sectional height must be maintained in order for the gasket to properly seal. Also, spiral-wound metal gaskets may only he used one time. As the body-bonnet bolting 18 is tightened, the spiral-wound metal gasket 36 is crushed to a height that is determined by the machine-tolerances and dimensional characteristics of the globe valve 10 assembly in which it is installed. The overall crush height of the spiral-wound metal gasket 36 physically limits the compressive load on the flat sheet gaskets 34 and 36. Spiral-wound metal gaskets cannot he re-used. The body-bonnet joint will leak. Additionally, in high temperature applications, the spiral-wound metal gaskets tend to relax and a leak between the valve body and valve bonnet may result.

Figure 2:
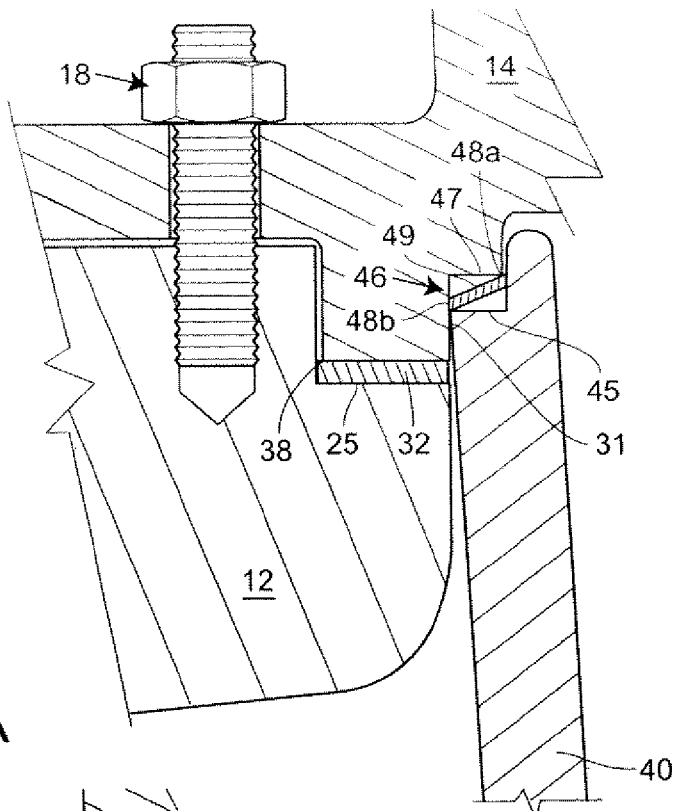
FIG. 2 is a partial cross-section side view of a globe valve using an elastically deformable bonnet seal in conjunction with a bonnet-retained cage.

One embodiment of the present seal assembly. illustrated in FIG. 2. addresses the problems associated with large, bonnet-retained style trim in globe valves. In this embodiment, a bolted-flange type valve bonnet 14 is attached to the globe valve body 12 with body-bonnet bolting 18. A flat sheet gasket 32 is placed between a first internal flange 38 of the valve bonnet 14 and a shoulder 25 of the valve body 12 to create a fluid seal between the valve body 12 and the valve bonnet 14. The valve cage 40 has an annular channel 45 to receive a deformable elastic seal 46. The elastic seal 46 is fashioned in the shape of a hollow, truncated cone similar to a Belleville washer and is preferably made from stainless steel such as S31600 SST. Other suitable grades of metal could also be used such as S30400 SST or N07750 Nickel Alloy. As depicted in cross-section in FIG. 2 the elastic seal 46 has an elastic region 49 between a first edge 48a and a second edge 4Th. The first edge 48a and second edge 48b circumscribe a corresponding small inner diameter and a large outer diameter of the elastic seal 46, respectively. A second internal flange 47 formed in the valve bonnet 14 loads the first edge 48a of the elastic seal 46 as the body-bonnet bolting 18 is tightened. In loading the first edge 48a, the second edge 48b is placed in contact with at least one of the inside wall 31 of the first internal flange 38 and/or the annular channel 45 of the valve cage 40. The elastic region 49 of the elastic seal 46 creates sufficient spring force to retain the valve cage and to provide the cage-body seal and the seat ring-body seal (not shown). But unlike conventional spiral-wound metal gaskets, the present elastic seal 46 provides adequate spring compression force to retain the valve cage 40 in high pressure applications through a wide temperature range by absorbing the differential expansion characteristics of the materials without requiring excessive torque on the body-bonnet bolting 18.

Figure 2A:
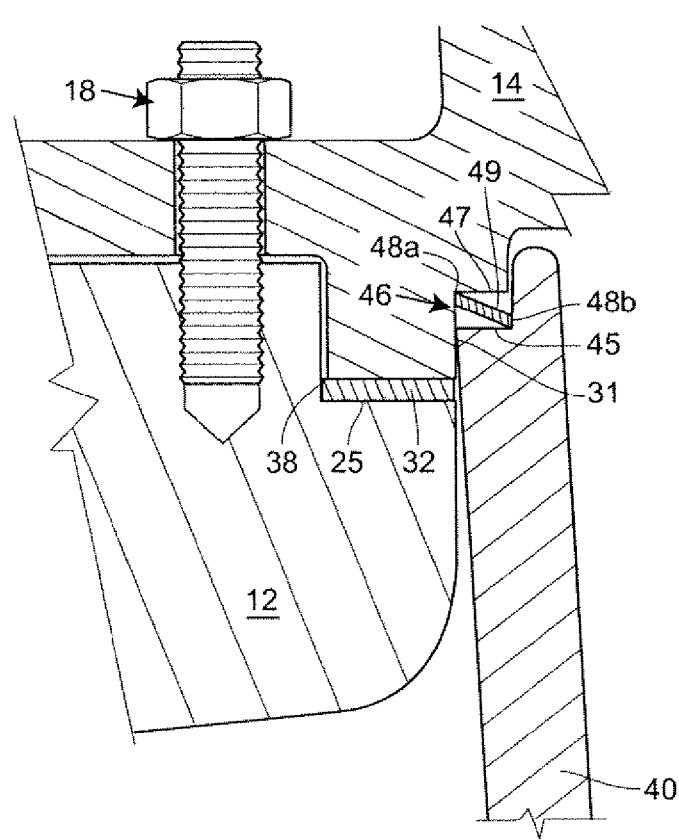
FIG. 2A is a partial cross-section side view of a globe valve using an elastically deformable bonnet seal in a reversed or flipped over position in conjunction with a bonnet-retained cage.

The spring force of the elastic seal 46 is a function of the thickness of the elastic seal 46 and the angle of the elastic seal 46 within the annular channel 45 of the valve cage 40. For example, a thickness of 0.185 inches with an angle of 30 degrees relative to the annular channel 45 is suitable for a 6-inch globe valve. The flat sheet gasket 32 provides the body-bonnet seal and the present elastic seal 46 creates a cage-body seal to substantially prevent leakage of high pressure upstream fluid into the down stream system. The elastic seal 46 has been found to have greater thermal integrity than a conventional spiral-wound metal seal and will not suffer relaxation under extreme thermal conditions. Because of the characteristics of the present elastic seal 46 the need for excessive body-bonnet bolting torque is substantially eliminated because the compliant nature of the seal provides improved dimensional compensation for thermal expansion and machine tolerance stack-up. During maintenance, the elastic seal 46 can be re-installed without degradation of the body-bonnet seal, thus lowering operating costs since seal replacement is not required. Additionally, as illustrated in FIG. 2A. the present elastic seal assembly 46 can be reversed or flipped over without degrading its claimed features.

Figure 3A:
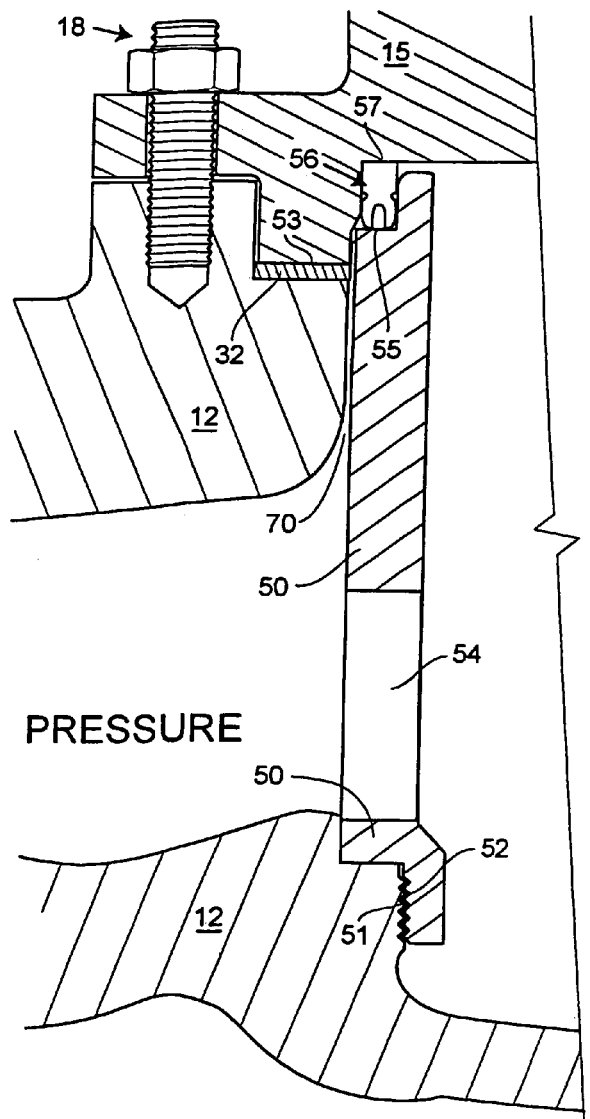
FIG. 3A is a partial section side view illustrating a hyperbolic elastic bonnet seal in conjunction with a screwed-in valve cage.
Figure 3B:
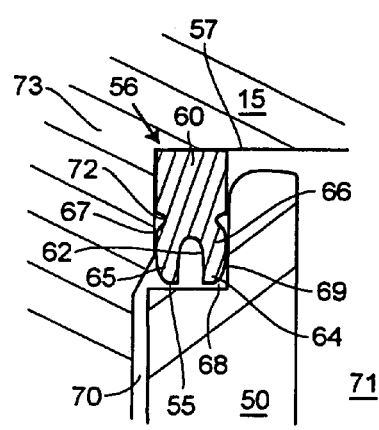
FIG. 3B is a detailed side view of the hyperbolic elastic bonnet seal depicted in FIG. 3A.

Another embodiment is illustrated in FIGS. 3A and 3B. The valve bonnet 15 in this embodiment has a first internal flange 53, as shown, to engage a flat sheet gasket 32 to create the body-bonnet fluid seal. As known to those skilled in the art, the valve cage 50 depicted in this embodiment is a screwed-in cage. As shown in FIG. 3A, external threads 52 on the base of the valve cage 50 engage mating internal threads 51 in the valve body 12 to retain the valve cage 50 in the valve body 12. A single hyperbolic elastic seal 56 is positioned in an annular channel 55 of the valve cage 50 and is engaged by a second internal flange 57 formed within the valve bonnet 15. The primary flow path for the upstream fluid is through an opening or window 54 in the valve cage 50. A secondary flow path occurs in a gap 70 between the valve body 12 and the valve cage 50 allowing upstream fluid to flow around the hyperbolic seal 56. FIG. 3B shows an expanded view of the single hyperbolic seal 56 under compressive load. As the valve bonnet 15 is attached to the valve body 12 and the body-bonnet bolting 18 is tightened, the second internal flange 57 of the valve bonnet 15 contacts and radially compresses the elastic seal 56 between the annular channel wall 69 of the valve cage 50 and/or the internal wall 67 of the bonnet 15 (depicted in FIG. 3B).

Continuing in FIG. 3B, the elastic seal 56 is a substantially Y-shaped seal (shown as an upside down Y pointing towards the valve body 12) comprised of a base 60 and a V-shaped elastic region 66 constructed from stainless steel such as S31600 SST. Other suitable grades of metal could also be used such as S30400 SST or N07750 Nickel Alloy. A relief 72 between the base 60 and the V-shaped elastic region 66 provides flexure of the elastic seal 56 under compressive load creating a spring seal. Additional spring seal force results from a first lip 64 and a second lip 65 that generally comprise the V-shaped elastic region 66. The thin-walled first lip 64 and second lip 65 combine to form an internal cavity 62 within the elastic seal 56. The spring force of the elastic seal 56 sufficient to seal against the upstream pressure. For example, a thickness of 0.065-inches for the lips 64 and 65 with cross-sectional height of 0.375-inches and a base height of 0.500-inches provides adequate spring force creating the cage-body seal for a 6-inch globe valve against 600 psi pressure.

Under compressive load, the elastic seal 56 flexes and deforms the first lip 64 and the second lip 65 of the V-shaped elastic region 66. The deformation can provide a breach or clearance 55 between the V-shaped elastic region 66 and the annular channel 68 of the valve cage 50, subsequently opening the internal cavity 62 to upstream fluid pressure entering from a gap 70 between the valve cage 50 and the valve bonnet 15. Due to the restrictive nature of the valve trim, the downstream region 71 beyond the valve cage 50 is at lower pressure. The pressure differential between the upstream pressure and downstream pressure allows the relatively higher fluid pressure entering through the gap 70 between the valve cage 50 and valve bonnet 15 to expand the V-shaped elastic region 66 into at least one of the annular channel wall 69 of the valve cage 50 and/or the internal wall 67 of the second internal flange 73 creating a pressure-assisted fluid seal between the valve cage 50 and the valve bonnet 15.

The present elastic seal 56 substantially eliminates the need for excessive body-bonnet bolting torque due to the compliant nature of the pressure-assisted seal. The single hyperbolic elastic seal 56 provides improved dimensional compensation for thermal expansion and machine tolerance stack-up by providing compliance or flexure in the seal assembly. A rigid conventional seal, such as the composite, spiral-wound metal seal, cannot provide this dynamic compensation. Additionally, during maintenance, the elastic seal 56 can be re-installed without degradation of the body-bonnet seal, thus reducing costs of maintenance and repair. Additionally, as understood by those skilled in the art, globe valves can also be used in a flow-down configuration whereby the direction of the flow, as illustrated in FIG. 1, is reversed. The present elastic seal 56 can be reversed or flipped over to allow upstream pressure, in a flow-down configuration, to form the claimed pressure-assisted seal. In a flow-down configuration, the internal cavity 62 between the first lip 64 and the second lip 65 of the V-shaped elastic region 66 is pointing up towards the valve bonnet 15.

Figure 4:
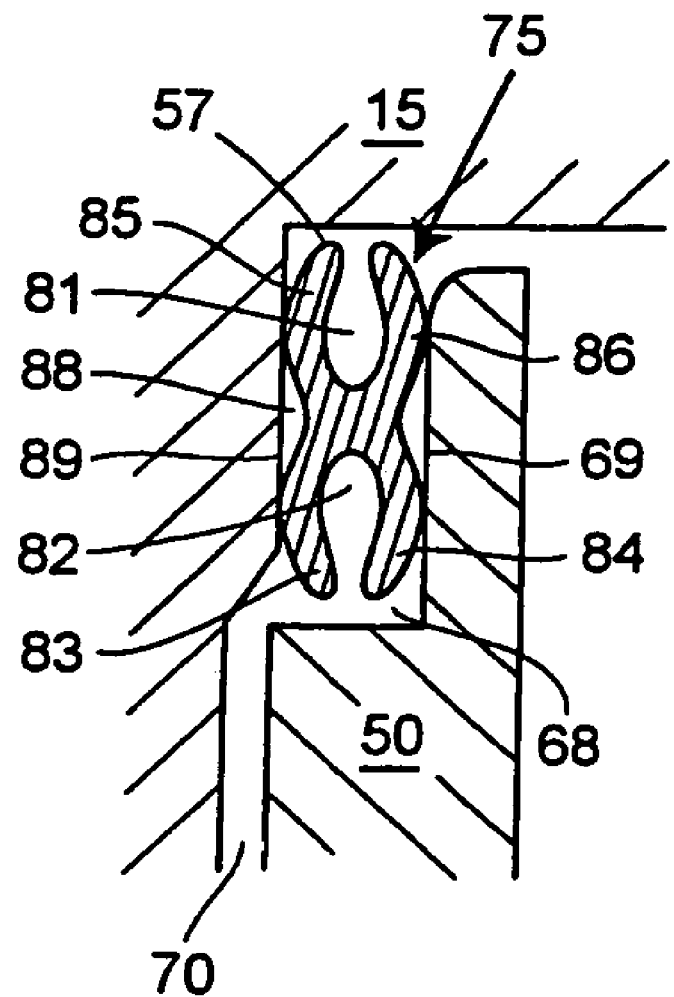
FIG. 4 is a partial side view illustrating a double hyperbolic elastic bonnet seal.

Referring now to FIG. 4, another embodiment of the present elastic seal assembly is illustrated. FIG. 4 depicts a double hyperbolic elastic seal 75 used in a large globe valve with a screwed-in valve cage 50. The elastic seal 75 in this embodiment is substantially X-shaped as depicted in FIG. 4. A first set of flexible lips 85 and 86 frame a first internal cavity 81 that form a compression surface on two surfaces of the valve bonnet 15; an inner flange wall 89 and a second internal flange 57, as shown. Similarly, a second set of flexible lips 83 and 84 form a second internal cavity 82 in mirrored opposition of the first set of flexible lips 85 and 86 and form a sealing surface in the annular channel 68 formed within the valve cage 50.

A relief 88 that circumscribes the interface between flexible lips 83-86 provides flexure within the elastic seal 75 to create a spring force. As with the previous embodiment, the preferred materials of construction are stainless steel such as S31600 SST. Other suitable grades of metal could also be used such as S30400 SST or N07750 Nickel Alloy. As described in the previous embodiment, the compression force from the valve bonnet 15 deforms the elastic seal 75 and creates a breach between the lips 83-86 and their corresponding material surfaces 57,68,69, and 89. Therefore, in a balanced-plug type globe valve, each lip of the present elastic seal 75 will receive pressure-assisted sealing from either or both the upstream fluid pressure and the downstream fluid pressure. As valve cage-bonnet seal is formed, the flexible lips 83-86 makes contact with the inner surfaces 57 and 89 of the valve bonnet 15 and the surfaces of the annular channel 68 and 69 of the valve cage 50. This particular configuration does not require specific orientation for either a flow-up or flow-down configuration.

Although this present elastic seal assembly has been described with reference to illustrative embodiments, this description is not intended to be construed in a limiting sense. Various modifications and combinations of the illustrative embodiments, as well as other embodiments of the present control element, will be apparent to persons skilled in the art upon reference to the description. It is therefore intended that the appended claims encompass any such modifications or embodiments. For example, the elastic seal configured in the shape of a hollow, truncated cone can also be used in a globe valve with a screwed-in cage.

I claim:

1. A seal assembly for a control valve wherein the valve comprises a valve body, a valve bonnet, and a valve cage, the seal assembly comprising:
   an annular seal placed between the valve cage and the valve bonnet, the annular seal having in combination an elastic region, a compression surface, and at least one sealing surface wherein the valve cage has a channel adjacent to the valve bonnet for receiving the annular seal; and
   the valve bonnet having a shoulder to engage the compression surface of the seal to deform the elastic region of the seal to place the sealing surface of the seal in contact with at least one of the valve bonnet or the valve cage to form a fluid seal,
   wherein the unloaded annular seal is comprised of a hollow truncated cone having a first edge proximate the shoulder and defined by a first diameter and a second edge defined by a second diameter wherein the compression surface is associated with the first edge, the sealing surface is associated with the second edge, and the elastic region is interposed between the first edge and the second edge.

2. The annular seal according to claim 1, wherein the first diameter is greater than the second diameter.

3. The annular seal according to claim 1, wherein the first diameter is less than the second diameter.

4. A fluid control valve comprising:
   a valve body having a fluid inlet, a fluid outlet, and a fluid passageway for communicating between the fluid inlet and the fluid outlet, and a valve seat in the fluid passageway for controlling the fluid flow;
   a valve bonnet mounted to the valve body, having a shoulder and defining a central longitudinal axis;
   a movable operator protruding through the valve bonnet for engaging the valve seat along the longitudinal axis;
   a valve seal comprising an annular seal including an elastic region, a compression surface, and at least one sealing surface;
   a valve cage mounted inside the valve body, the valve cage having a channel adjacent to the valve bonnet for receiving the valve seal wherein a force applied to the compression surface by the valve bonnet deforms the elastic region creating a spring force to place the sealing surface in contact with at least one of the valve bonnet or the valve cage to form a fluid seal,
   wherein the unloaded annular seal is comprised of a hollow truncated cone having a first edge proximate the shoulder and defined by a first diameter and a second edge defined by a second diameter wherein the compression surface is associated with the first edge, the sealing surface is associated with the second edge, and the elastic region is interposed between the first edge and the second edge.

5. The annular seal according to claim 4, wherein the first diameter is greater than the second diameter.

6. The annular seal according to claim 4, wherein the first diameter is less than the second diameter.

7. A seal assembly for use with a control valve, the control valve including a valve body, a valve bonnet, a valve cage, and an annular channel formed in the valve cage adjacent an annular shoulder on the valve bonnet, the seal assembly comprising:
   an annular seal sized for insertion in the annular channel, the annular seal having an uncompressed shape comprising a hollow truncated cone having an inner diameter and a larger outer diameter;
   the annular seal sized to be positionable within the annular channel in a first position in which the outer diameter is disposed adjacent the annular shoulder of the valve bonnet; and
   the annular seal further sized to be positionable within the annular channel in a second position in which the inner diameter is disposed adjacent the annular shoulder of the valve bonnet.

* * * * *

UNITED STATES PATENT AND TRADEMARK OFFICE
CERTIFICATE OF CORRECTION

PATENT NO. : 7,380,768 B2 Page 1 of 1
APPLICATION NO. : 11/361216
DATED : June 3, 2008
INVENTOR(S) : Hans D. Baumann It is certified that error appears in the above-identified patent and that said Letters Patent is hereby corrected as shown below:

In the Specification:

At Column 4, line 19, "assembly." should be -- assembly, --.

At Column 4, line 33, "FIG. 2" should be -- FIG. 2, --.

At Column 4, line 35, "4Th" should be -- 48b --.

Signed and Sealed this

Twenty-third Day of December, 2008

JON W. DUDAS
*Director of the United States Patent and Trademark Office*